United States Patent [19]
Taniguchi et al.

[11] Patent Number: 5,790,284
[45] Date of Patent: Aug. 4, 1998

[54] DISPLAY APPARATUS AND DISPLAYING METHOD FOR IMAGE DISPLAY PRODUCING STEREOSCOPIC EFFECT

[75] Inventors: Naosato Taniguchi, Machida; Susumu Matsumura, Kawaguchi; Yoko Yoshinaga, Kawasaki; Shin Kobayashi, Atsugi; Toshiyuki Sudo, Kawasaki; Hideki Morishima, Tokyo; Tadashi Kaneko, Isehara, all of Japan

[73] Assignee: Canon Kabushiki Kaisha, Tokyo, Japan

[21] Appl. No.: 749,182

[22] Filed: Nov. 14, 1996

Related U.S. Application Data

[63] Continuation of Ser. No. 251,711, May 31, 1994, abandoned.

[30] Foreign Application Priority Data

Jun. 1, 1993 [JP] Japan ................... 5-154231

[51] Int. Cl.$^6$ ............ G02B 5/32; G02B 27/22; G03H 1/00; G09G 5/00
[52] U.S. Cl. ................... 359/15; 359/1; 359/13; 359/462; 345/7; 345/8; 348/52; 348/53
[58] Field of Search ................... 359/13, 15, 462, 359/463, 464, 466, 477, 22, 23, 1, 14; 348/115, 51, 52, 40, 42; 345/7, 8; 349/15

[56] References Cited

U.S. PATENT DOCUMENTS

| | | |
|---|---|---|
| 4,647,142 | 3/1987 | Boot .................... 359/13 |
| 5,037,166 | 8/1991 | Malcolm et al. .......... 359/15 |
| 5,187,597 | 2/1993 | Kato et al. ............. 359/22 |
| 5,198,895 | 3/1993 | Vick .................... 348/115 |
| 5,396,349 | 3/1995 | Roberts et al. .......... 359/14 |
| 5,461,499 | 10/1995 | Sugita et al. .......... 359/13 |
| 5,589,956 | 12/1996 | Morishima et al. ....... 359/15 |

FOREIGN PATENT DOCUMENTS

| | | |
|---|---|---|
| 4248583 | 4/1992 | Japan . |
| 404233572 | 8/1992 | Japan ................... 359/13 |

*Primary Examiner*—Paul M. Dzierzynski
*Assistant Examiner*—Audrey Chang
*Attorney, Agent, or Firm*—Morgan & Finnegan LLP

[57] ABSTRACT

This specification discloses a displaying apparatus having a display emitting light, and an optical element formed by two holograms each having optical power and partially overlapping each other. The light from the display is diffracted by one of the holograms to be directed to an observer's left pupil, and is diffracted by the other hologram to be directed to the observer's right pupil.

9 Claims, 14 Drawing Sheets

DISPLAY APPARATUS AND DISPLAYING METHOD FOR IMAGE DISPLAY PRODUCING STEREOSCOPIC EFFECT

This is a continuation of application Ser. No. 08/251,711, filed on May 31, 1994 now abandoned.

BACKGROUND OF THE INVENTION

1. Field of the Invention

This invention relates to a three-dimensional image displaying method and an image displaying apparatus, and particularly to a three-dimensional image displaying method and an image displaying apparatus which are capable of accomplishing compact and large-screen and highly fine display and in which the so-called "cardboard effect" is not created or is mitigated when image information displayed by an image display element is displayed as a virtual image to an observer.

SUMMARY OF THE INVENTION

To display image information displayed by an image display element such as liquid crystal as a large screen image with presence, a large CRT display apparatus, a projection TV set or the like has heretofore been conventionally used.

However, these apparatuses have suffered from the problem that a large space is required or it is difficult to observe a good screen image unless the surroundings are darkened, and have been limited in conditions of use.

Therefore, recently, there has been proposed an image displaying apparatus in which a beam of light from an image displayed by an image display element is projected directly onto eyes (an observer's pupils) by an optical system disposed closely adjacent to the face and the image information of an equivalently large screen is observed as a virtual image.

FIG. 1 of the accompanying drawings shows an example of such an apparatus, and illustrates the essential portions of an image displaying apparatus proposed in Japanese Patent Application Laid-open No. 4-34512. An image is displayed on a liquid crystal display (liquid crystal panel) 201 by data sent by a signal line 206. The liquid crystal display 201 is transmission-illuminated by a backlight source 204. A beam of light 208 based on the image information displayed on the liquid crystal display 201 passes through a magnifying lens 203 comprising a concave lens and a convex lens, whereafter the beam 208 is reflected by a mirror 205 to be incident on the eye (pupil) 207 of an observer 210 as a beam of reflected light 209.

Accordingly, the observer observes the displayed image by the beam of light 209. At this time, the magnifying lens 203 causes the image displayed on the liquid crystal display 201 to be displayed as a virtual image on a virtual image plane 202 at a predetermined distance from the observer's pupil 207, e.g. 5 m ahead of the observer's pupil, via the mirror 205.

As a result, the observer observes the image information displayed on the virtual image plane 202 by the liquid crystal display 201.

Besides this, in a head mounted display called "Eyephon" (registered as a trademark) which has been commercialized by VPL Research, Inc., two sets of liquid crystal displays of about 3 inches are prepared for right and left eyes, and respective display images are observed through a Fresnel lens, whereby an image with stereoscopic effect is displayed.

In these conventional art three-dimensional image displaying methods, image forming optical systems corresponding to right and left eyes are prepared, and an image conforming to the vision difference is displayed to thereby realize giving stereoscopic effect.

As a further example of the image display having a three-dimensional feeling, there is a three-dimensional image displaying apparatus as shown in Japanese Patent Laid-Open Application No. 4-248583. FIG. 2 of the accompanying drawings is a block diagram thereof. This method selectively displays each portion of a display object while varying the display position thereof, and a display image is presented near the position which ought to be a part of the most natural three-dimensional image, whereby a three-dimensional image is completed by utilization of the after-image effect of the eyes.

However, in the conventional image displaying apparatus shown in FIG. 1, the image display element itself is small and therefore, there is the problem that number of pixels displayed is limited. Therefore, if the display of a large screen image is effected by simple enlarged projection, the pixels will be observed by the observer, and this has led to the problem that it is difficult to observe image information well.

For example, where a small liquid crystal display is used as an image display element, many of the existing apparatuses have about 300,000 pixels. Therefore, they only have same resolving power as that when NTSC signal is video-outputted, and it is difficult to effect the display of a larger screen or effect highly minute display.

Also, the above-mentioned "Eyephon" weights about 1.2 kg. and suffers from a problem of being heavy. If in this state, an attempt is made to display a larger screen image, a diameter of the Fresnel lens used in the apparatus will have to be made still larger.

However, for example, a distance between both eyes of the Japanese is about 62.5 mm on the average and therefore, it is difficult to make the Fresnel lens any larger and if it were possible at all, there would be the problem that the weight would be further increased.

With the above-noted points taken into account, it is a first object of the present invention to provide a compact and light-weight image displaying apparatus capable of effecting large screen display.

However, the method for fixing the image display position suffers from the problem that only difference between the right and left points of view is represented and depth position of the image is not varied.

Namely, in a case where a person observes an object in a daily life, the person observes the object by having a convergence angle of his or her eye changed to be concerned in a plurality of images corresponding to each of the changed convergence angles to obtain a three-dimension information of the object.

But in a case where a person merely observes an image with a single fixed convergence angle of his or her eye, there has been a problem called as "Cardboard Effect" that the person would see the image as if the image were flat-shaped.

In contrast, in the example of the conventional art shown in FIG. 2 or the like wherein a three-dimensional object is displayed with the display position of an image actually varied, when the image is observed, a portion which ought to be not seen behind the display object correspondingly to the vision difference between right and left eyes is displayed, and this leads to a problem that an image of a different nature from a usual image is observed.

Also, there is a limitation by the size of the image displayed and it is necessary to drive the displaying portion by an amount corresponding to a variation in the depth position. Particularly when the display of an image having a great depth difference is effected, the rate per unit time allotted for the displaying each depth portion decreases.

In the examples of a conventional art, image display is effected by utilization of afterimage effect of an eye and therefore, it is necessary to heighten display luminance of each depth portion, and there has virtually been a limit on a point of safety of an observer's eye.

With the above-noted points taken into account, it is a second object of the present invention to provide a three-dimensional image displaying method capable of displaying a good three-dimensional image which is soft to eyes and does not create the "Cardboard Effect".

To achieve this object, one mode of a displaying apparatus of the present invention is characterized by a display emitting light, and an optical element in which two holograms each having optical power are formed partially overlapping each other. The light from said display is diffracted by one of two holograms to be directed to an observer's left pupil, and is diffracted by the other hologram to be directed to the observer's right pupil.

A preferred mode of the display is provided with two displays, and light of one of said two displays is diffracted by the one hologram to be directed to the observer's left pupil, and light of the other display is diffracted by the other hologram to be directed to said observer's right pupil.

A preferred mode of the holograms is a volume phase type hologram.

One mode of the displaying method of the present invention is characterized by:

the step of forming two holograms each having optical power in partially overlapping relationship with each other;

the step of emitting light from a display; and the step of diffracting the light from the display by one of the two holograms to direct it to an observer's left pupil, and diffracting said light by the other hologram to direct it to the observer's right pupil.

Another mode of the displaying apparatus of the present invention is characterized by:

a display emitting light; and an optical system for directing light from the display to an observer's pupils, forming virtual images of the display displayed on said display at a plurality of positions in the direction of the optical axis of the optical system, and causing the observer to observe the virtual images.

A more preferred mode of the displaying apparatus has virtual image selecting means for causing said observer to observe at least two of the plurality of virtual images differing in position alternately.

A more preferred mode of the displaying apparatus has means for controlling time for which the observer is caused to observe one virtual image.

In a more preferred mode of the displaying apparatus, displaying apparatuses are provided correspondingly to the observer's left and right pupils.

A more preferred form of said displaying apparatus has virtual image selecting means for causing the observer to observe at least two of the plurality of virtual images differing in position alternately.

A more preferred form of the displaying apparatus has angle varying means for varying an angle formed by optical axes of the two optical systems corresponding to the observer's left and right pupils.

A more preferred mode of the displaying apparatus has control means for varying the angle formed by the optical axes of the two optical systems, in synchronism with virtual images observed.

Another mode of the displaying method of the present invention is characterized by:

the step of emitting light from a display; and the step of directing light from the display to an observer's pupils by an optical system, forming the virtual images of display displayed on the display at a plurality of positions in a direction of an optical axis of the optical system, and causing the observer to observe the virtual images.

Several features and specific modes of the present invention are described in detail in the embodiments of the invention which will be described later.

DESCRIPTION OF THE PREFERRED EMBODIMENTS

Figure 1:
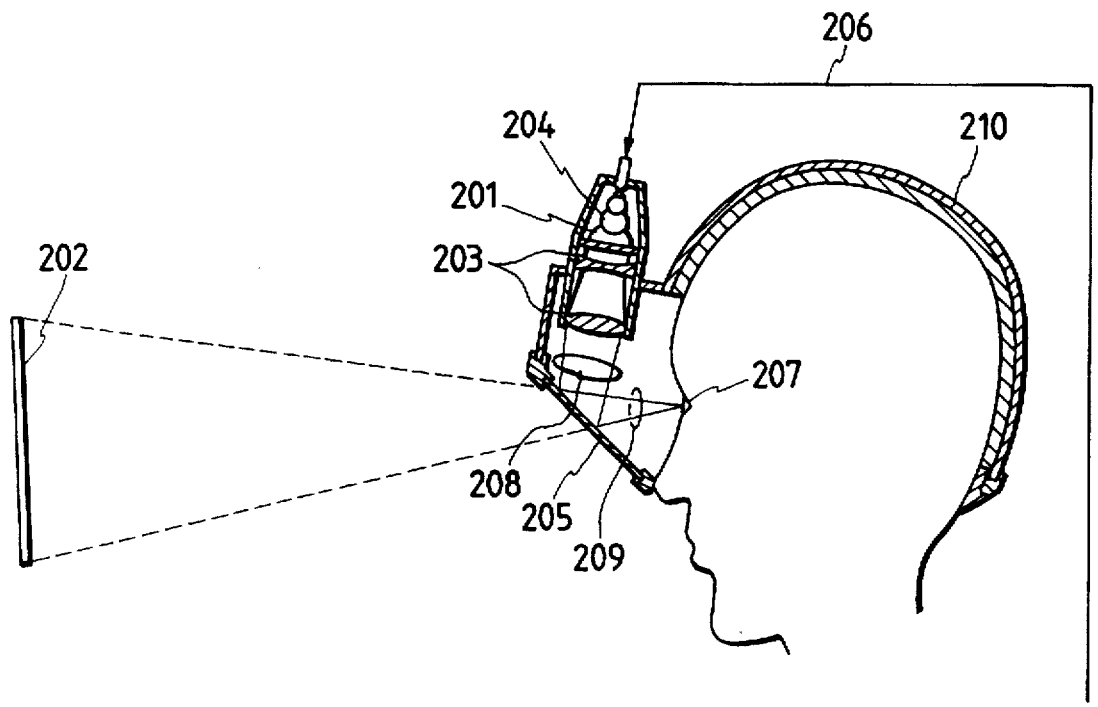
FIG. 1 is a schematic view of an image displaying apparatus according to a conventional art.
Figure 2:
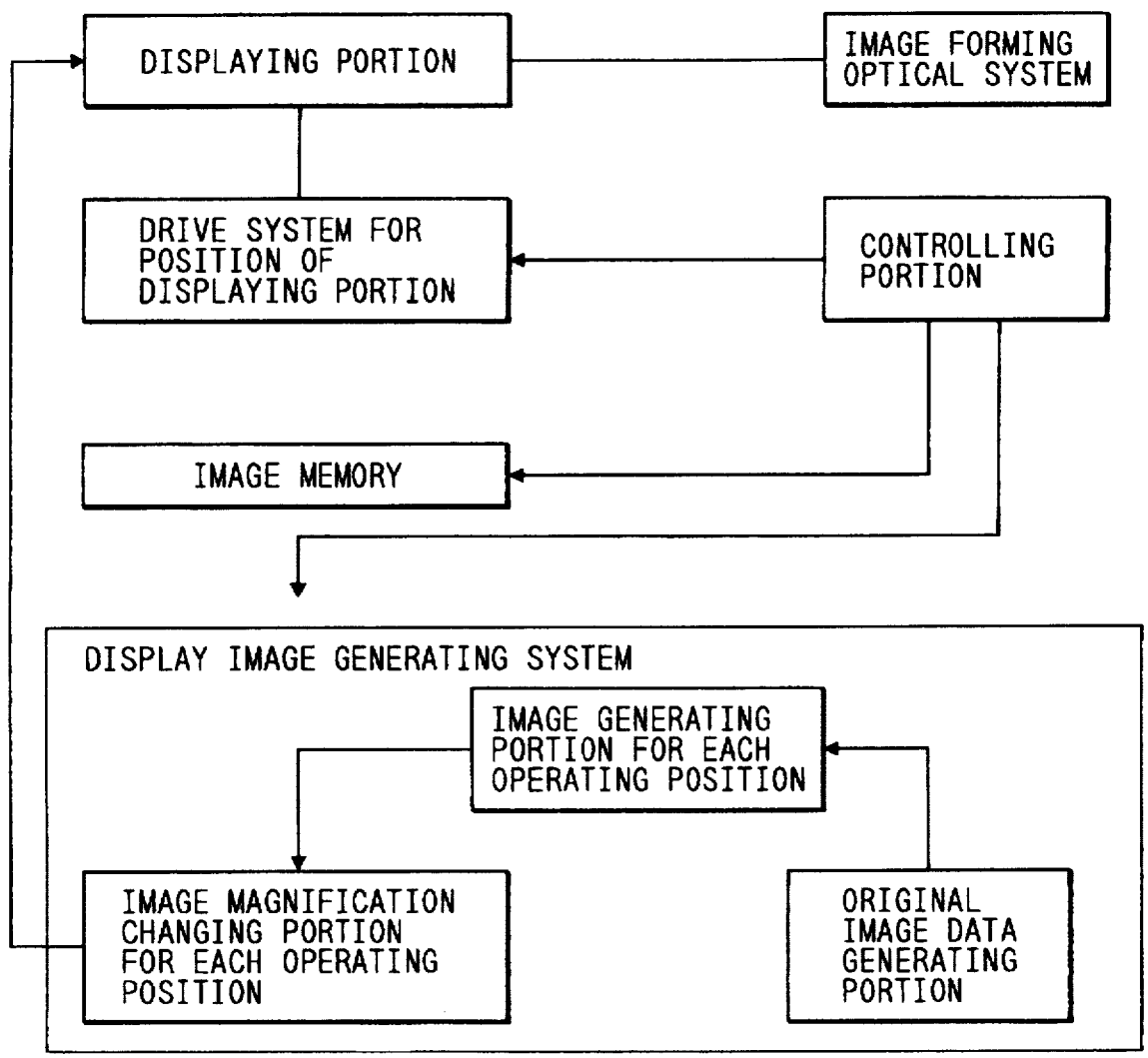
FIG. 2 is a block diagram of a three-dimensional image displaying apparatus using a plurality of imaging plane displays according to a conventional art.
Figure 3:
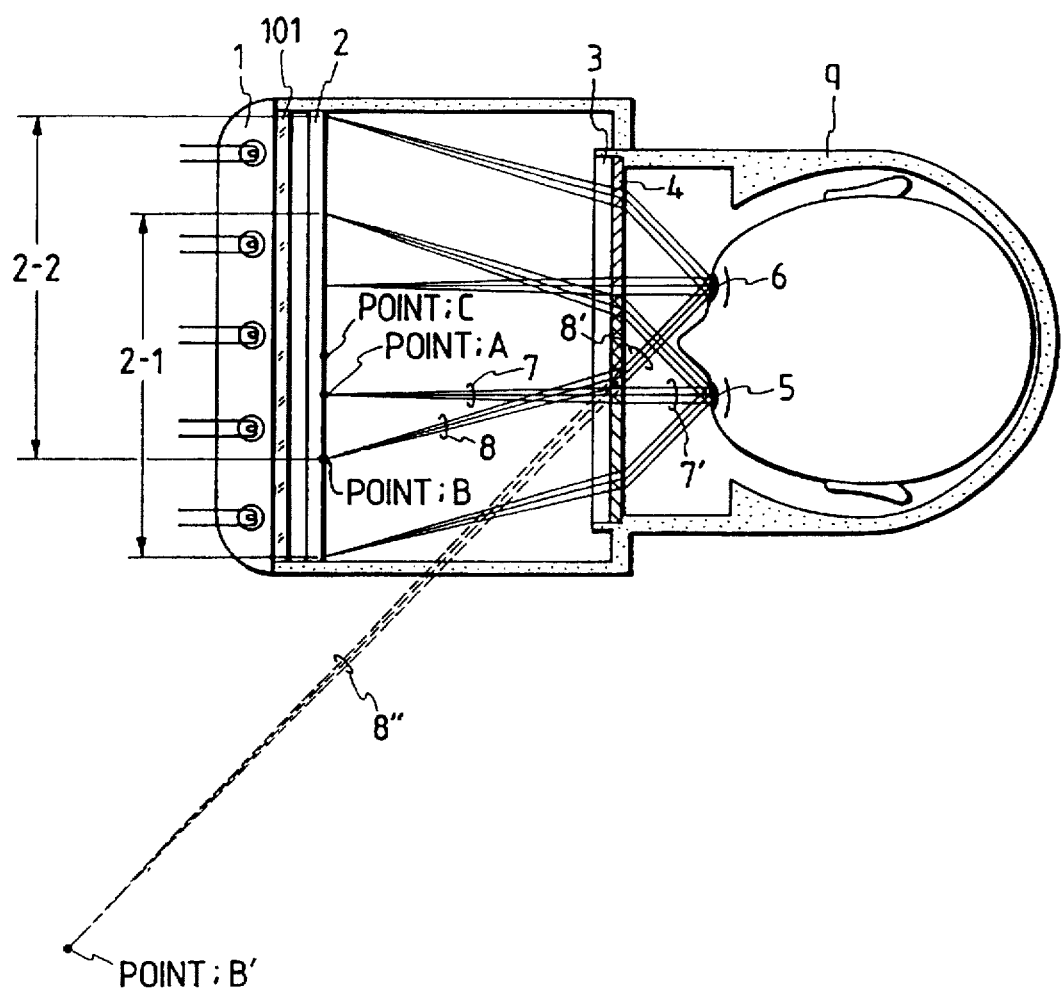
FIG. 3 shows Embodiment 1 of the present invention.

FIG. 3 is a schematic view showing essential portions of an image displaying apparatus according to Embodiment 1 of the present invention.

In the present embodiment, an apparatus fixed to a member 9 such as a goggle-like member or a helmet is shown as being mounted on an observer's head.

A beam of light emitted from a backlight source 1 such as a halogen lamp or a fluorescent lamp has its light of a predetermined wavelength selectively transmitted through a wavelength limiting element 101 such as an interference filter and illuminates an image display element 2 such as an LCD element. The illuminating beam of light is transmitted through the image display element 2, whereby it is modulated and becomes a beam of image displaying light to be incident on a hologram lens 4 formed on a base plate 3 of glass or plastic or the like.

Figure 4:
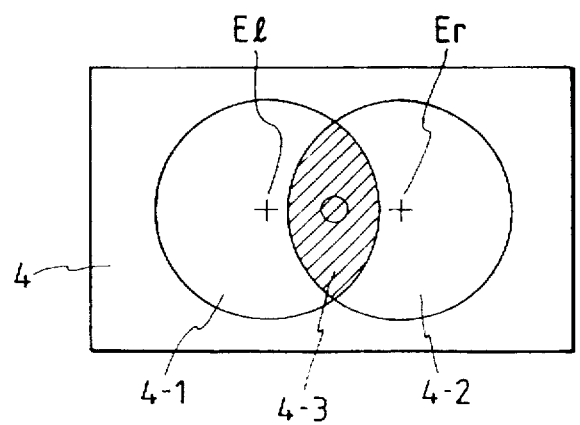
FIG. 4 is a schematic view of a hologram lens used in Embodiment 1.

The hologram lens 4 is comprised of two hologram lens areas, i.e., a lens area 4-1 for a left eye and a lens area 4-2 for a right eye, as shown in FIG. 4, and is made by the double exposure method. Interference fringes of a hologram are recorded on each of the areas, and two interference fringes are double-exposed on an area 4-3 which is a portion common to the two areas.

The action of the hologram lens 4 will be described with reference again to FIG. 3. A divergent beam of light 8 emitted from a point B on the image display element 2 is diffracted by the hologram lens 4-2 for the right eye, is converted into a divergent beam of light 8' looser than the beam of light 8 to be incident on the right eye 6.

As a result, the observer observes the beam of light 8 created from the point B as the beam of light 8' emitted from a farther point B'. Likewise, a beam of light 7 emitted from a point A is converted into a looser divergent beam of light 7' by the diffracting action of the hologram lens 4-1 to be incident on the left eye 5. The image on the image display element 2 is enlarged as a virtual image by the above-described action, and is observed by the observer.

A volume phase type hologram recorded on a photopolymer by the two-beam interference method using an argon ion laser is used as the hologram lens 4 in the present embodiment. Besides this, a conventional known hologram making method can be utilized. The volume phase type hologram has the character that it is splendid in angular selectivity exhibiting incidence angle dependency of diffraction efficiency and therefore, it is suitable as the hologram lens used in the present invention.

Figure 5:
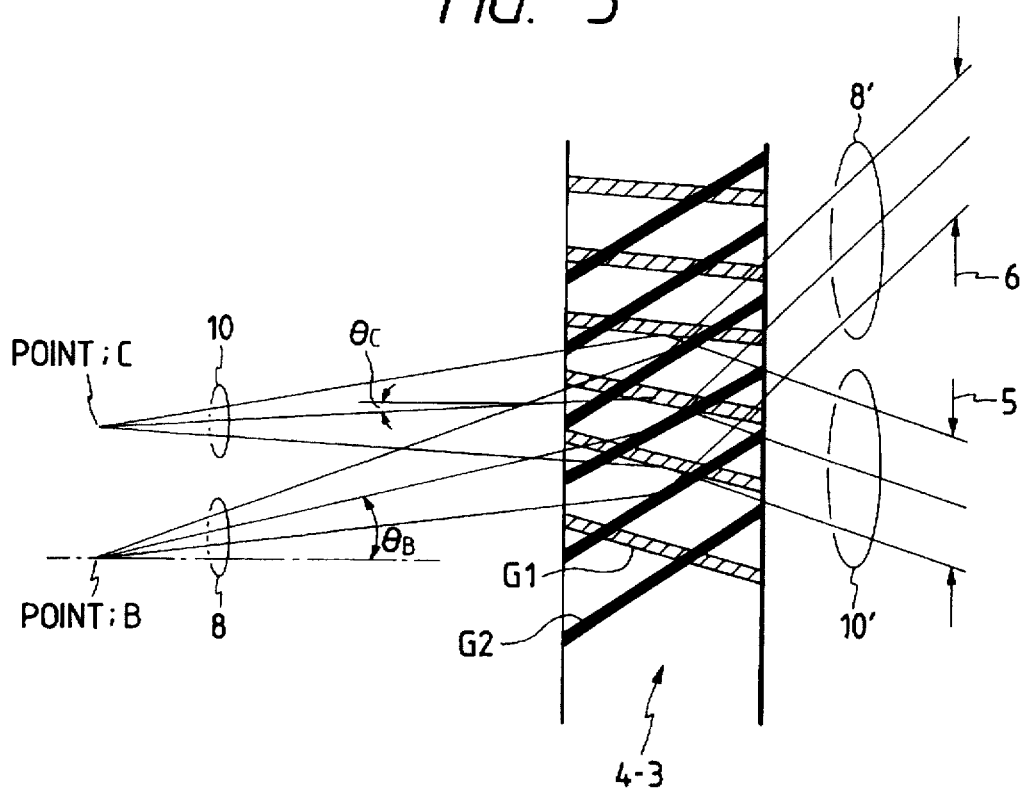
FIG. 5 shows the image formation by a multiplex recording portion of the hologram lens in Embodiment 1.
Figure 6:
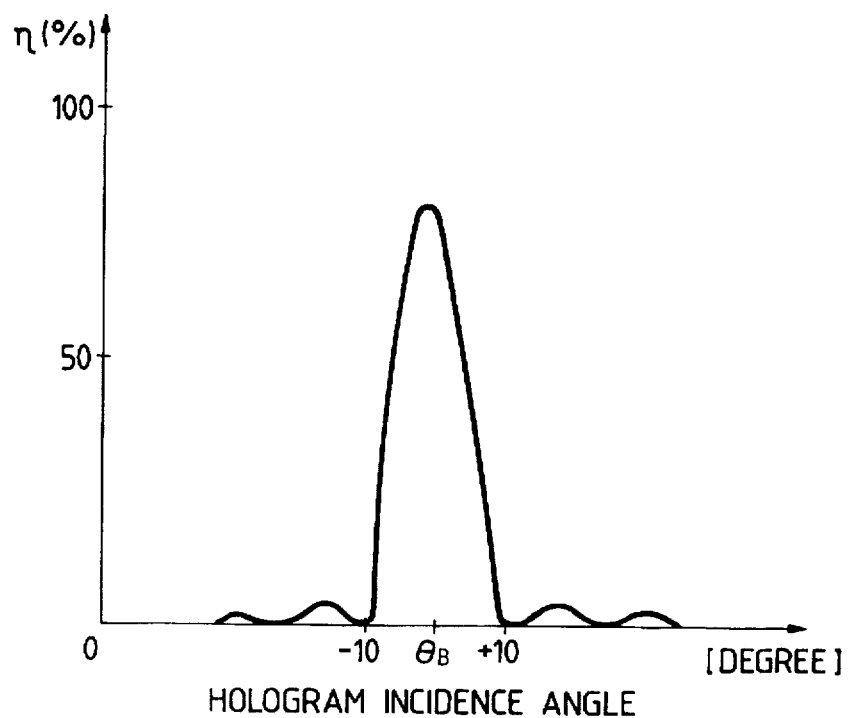
FIG. 6 is a graph showing angle selectivity of the hologram lens.

FIGS. 5 and 6 show the function and effect of the volume phase type hologram. FIG. 5 schematically represents interference fringes formed in the double-exposed area 4-3 of FIG. 4. The area 4-3 is an area in which effective portions to the both eyes overlap each other, and must perform the function of individually separating the beam of light going to the left eye and the beam of light going to a right eye as desired and imaging them.

FIG. 5 also shows the optical paths of the beams of light emitted from points B and C on the image display element 2. The beam of light 8 emited from the point B is converted into the beam of light 8' entering the observer's right eye 6 by the hologram lens 4-2.

On the other hand, a beam of light 10 emitted from the point C is converted into a beam of light 10' entering the observer's left eye 5 by the hologram lens 4-1. A grating G1 indicated by hatching corresponds to the hologram lens 4-1, and a grating G2 indicated by solid line corresponds to the area 4-2, and the both gratings coexist in the area 4-3. The principal ray of beam of light 8 emitted from the point B which comes to enter the center of the observer's right pupil is incident on the hologram lens at an angle of incidence $\theta_B$.

What is shown in FIG. 6 is angular selectivity of the hologram lens 4-2. The graph of angular selectivity is one in which the hologram is rotated with the angle of incidence $\theta_B$ as the center and diffraction efficiency thereof is plotted.

From the convenience in the manufacture of the hologram, the angle of incidence $\theta_B$ is a Bragg angle, and it is seen that only the rays of light having incidence angles in the vicinity of $\theta_B$ are diffracted by the hologram lens 4-2 having the grating G2 arrive at the right eye.

From FIG. 6, it is seen that the hologram lens 4-2 has strong diffraction efficiency within an angle of $\theta_B \pm 10°$ and therefore the expanse of the beam of light 8 is limited to 20° at greatest. Any light of the other angles than this incidence angle is not diffracted by the hologram lens 4-2.

Accordingly, the hologram lens 4-2 effects no action on the beam of light 10 from the point C on the display element and merely transmits therethrough the light incident thereon.

The hologram lens 4-1 having the grating G1 corresponds to the beam of light from the point C. The grating G1 is set such that its diffraction efficiency becomes a peak with respect to a ray of light having an incidence angle $\theta_C$. The beam of light 10 incident at the angle $\theta_C$ is diffracted toward the left eye 5 by the hologram lens 4-1. The hologram lens 4-1 effects no action on the beam of light 8 from the point B on the display element, and merely transmits therethrough the light incident thereon.

The hologram lenses 4-1 and 4-2 are multiplexly recorded on the area 4-3, but by using the angular selectivity of the hologram as described above, the two hologram lenses can display independent lens functions free of cross talk therebetween.

As shown in FIG. 3, in Embodiment 1 of the present invention, a range 2-1 corresponds as the object point of the hologram lens 4-1 and a range 2-2 corresponds as the object point of the hologram lens 4-2. The area 2-1 and the area 2-2 are overlapped each other on the image display element 2 and therefore, the present embodiment corresponds to an example in which a two-dimensional display image is enlargedly observed by both eyes.

Figure 7:
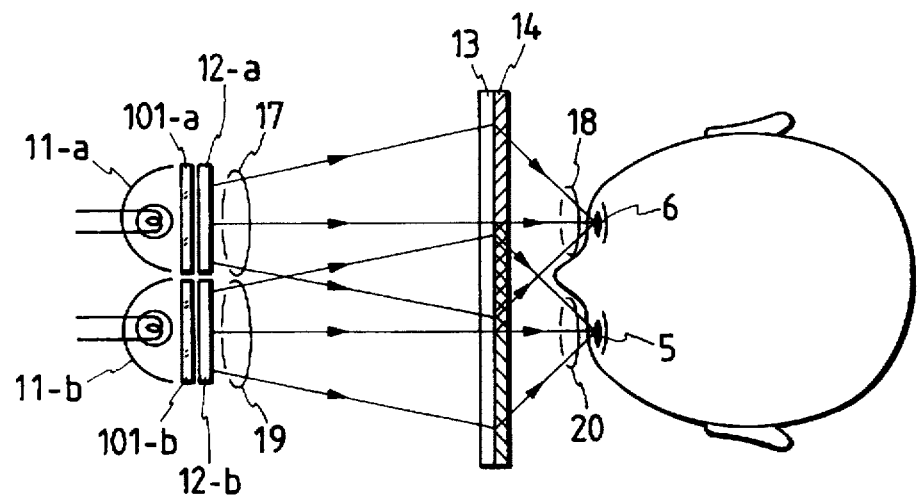
FIG. 7 shows Embodiment 2 of the present invention.

FIG. 7 is a schematic view of the essential portions of Embodiment 2 of the image displaying apparatus of the present invention. In this figure, for the simplification of illustration, the member to be mounted on the head is omitted and only the construction of portions regarding the optical system is shown, and the same constituents as those in Embodiment 1 are given the same reference numerals. The functions of various portions in the present embodiment are similar to those in Embodiment 1 and therefore, only different portions will be described here.

The feature of the present embodiment is that image display elements 12-a and 12-b such as LCDs are independently provided for a right eye and for a left eye. Two images can be discretely presented on the image display elements 12-a and 12-b.

A beam of light 17 emitted from the image display element 12-a for the right eye is diffracted by a hologram lens 14 to be converted into a beam of light 18 to be incident on the right eye 6. Likewise, a beam of light 19 emitted from the image display element 12-b for the left eye is diffracted by the hologram lens 14 to be converted into a beam of light 20 to be incident on the left eye 5.

In FIG. 7, there are shown several principal rays (rays passing through a center of a pupil) of the beams of light emitted from respective points on the image display elements 12-a and 12-b.

Figure 8:
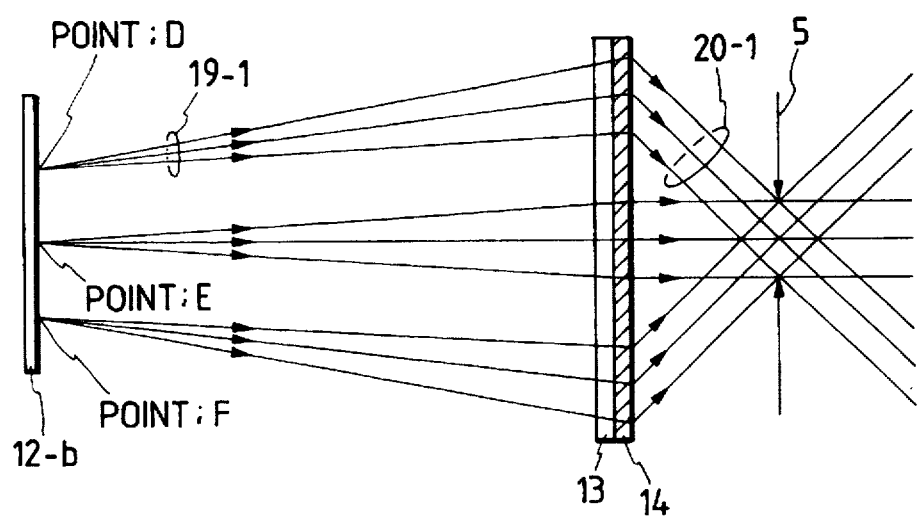
FIG. 8 shows an image formation by a hologram lens in Embodiment 2.

FIG. 8 shows the optical paths in Embodiment 2 in greater detail with respect to ones for the left eye, and a view entirely similar to the FIG. 8 can be drawn for the right eye.

The light modulated by the image display element 12-b for the left eye, for example, a beam of light 19-1 emitted from a point D, is diffracted by the hologram lens 14 to be converted into a beam of light 20-1 to be incident on the left eye 5. Beams of light emitted from the other points E and F on the image display element 12-b are likewise diffracted by the hologram lens 14 to be incident on the left eye 5.

Separation of the display elements for the right eye and the left eye in the present embodiment is accomplished by making optical power of the two hologram lenses recorded on the hologram lens 14 stronger than in Embodiment 1. Since the optical power is strong, the light is subjected to a deflecting action stronger than in Embodiment 1 with a result that overlap can be eliminated on the image display elements at the object points of the both eyes. The images on the respective display elements are independently observed by the corresponding eyes.

Therefore, the images presented on the image display elements 12-a and 12-b can be different from each other. For example, parallax images conforming to parallaxes of the both eyes are displayed on the image display elements 12-a and 12-b and are caused to be incident on the right eye 6 and the left eye 5, respectively, whereby an image effecting stereoscopic effect can be observed by the observer.

Assuming that the present embodiment is used in display elements for amusement such as a game or display elements for virtual reality, a larger screen display than before is possible. By making the angle of field of view into a wide angle of field of about 50° in vertical and horizontal directions, there can also be obtained a three-dimensional image with presence called "an induced visual field".

Figure 9:
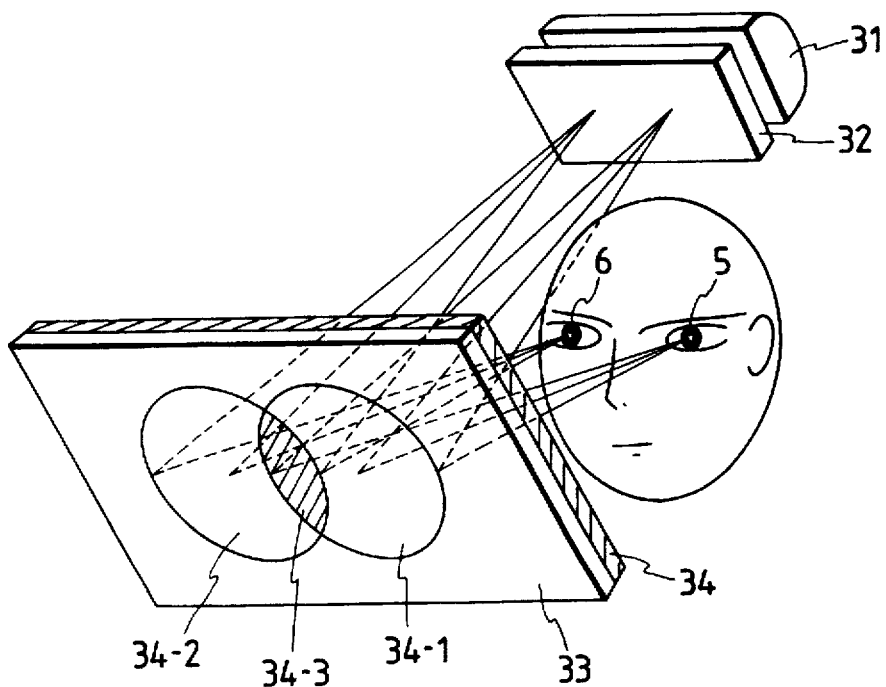
FIG. 9 shows Embodiment 3 of the present invention.

FIG. 9 is a schematic view of Embodiment 3 of the present invention. In FIG. 9, the same constituents as those in the previous embodiments are given the same reference numerals. FIG. 9 is exaggerately depicted to make the arrangement of various elements readily understood, but an actual apparatus is a very compact one in which the distances between the both eyes 5, 6 and a hologram lens 34 are about 45 mm.

The feature of the present embodiment is that the hologram lens 34 is changed from the transmission type hologram used in Embodiments 1 and 2 to a reflection type hologram. Numeral 31 designates a backlight source, and numeral 32 denotes an image display element. In accordance with the power of the hologram lens 34, the same image for the both eyes may be displayed on the image display element 32, or discrete images for the both eyes may be separately displayed on the image display element 32.

Again in the present embodiment, a hologram lens 34-1 for the left eye and a hologram lens 34-2 for the right eye are recorded double and realize a wider display image than before.

If the hologram used in the present embodiment is made into a value phase type hologram, it will be possible to utilize the property of a so-called Lippmann hologram which is excellent in wavelength selectivity (wavelength dependency of diffraction efficiency).

Therefore, in the present embodiment, the virtual image by the present invention can be superposed on other image such as an external scene and the two images can be observed at a time.

Figure 10:
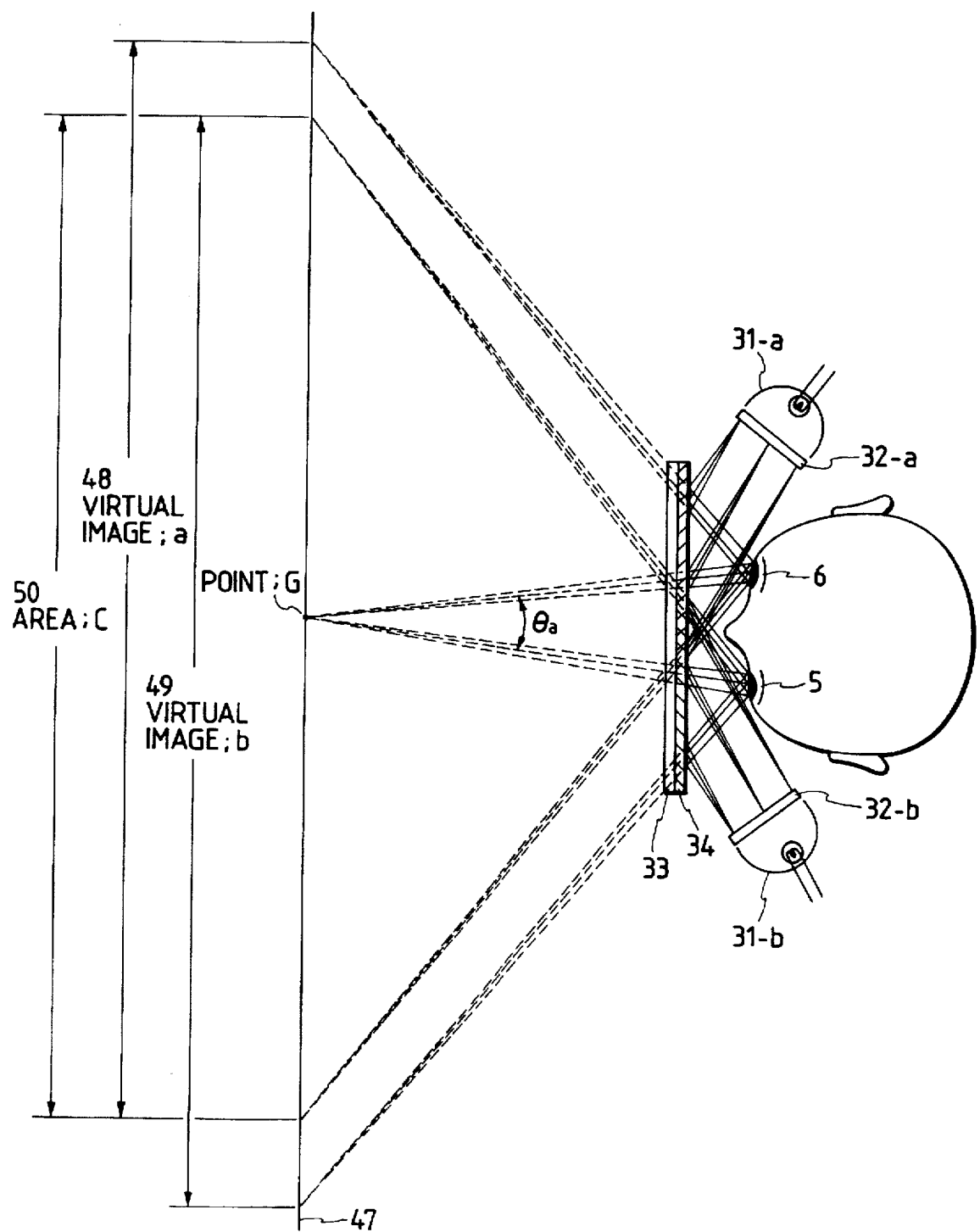
FIG. 10 shows Embodiment 4 of the present invention.

FIG. 10 is a schematic view showing Embodiment 4 of the present invention. In FIG. 10, constituents functionally similar to those in the previous embodiments are given the same reference numerals. The present embodiment is a modification of Embodiments 2 and 3, and uses two image display elements 32-a and 32-b for the right eye and the left eye, respectively, and these are disposed laterally of the two ears.

In the present embodiment, it is also a feature that each virtual image is set so as to be able to be displayed with the convergence angle $\theta_a$ of the both eyes. The functions of the respective portions of the apparatus are the same as those in Embodiment 2 with the exception that the transmission type hologram lens 14 in Embodiment 2 has been changed to a reflection type hologram lens 34. However, because of the reflection type hologram being used, the images displayed by the image display elements are in mirror image relationship with those in Embodiment 2.

In the present embodiment, image information displayed by the image display element 32-a for the right eye is observed as a virtual image a in an area 48 by the observer's right eye 6, and image information displayed by the image display element 32-b for the left eye is observed as a virtual image b in an area 49 by the observer's left eye 5. At this time, a point G on a virtual image plane 47 is set as a gaze point, that is, a convergence angle $\theta_a$ is provided, whereby the focal positions of the respective eyes can be made coincident with the virtual image plane 47.

As a result, it is possible to eliminate the fatigue of the eyes or the physiological unpleasant feeling that "in spite of the virtual image position being not infinity, the directions of the visual axes are made parallel" which has been a problem peculiar to the head mount type displaying apparatus (HMD) according to the conventional art.

In the present embodiment, the image display elements 32-a and 32-b independently exist correspondingly to the right and left eyes. Therefore, parallax images corresponding to the respective eyes are displayed on the display elements, whereby an image C producing stereoscopic effect can be observed in an area 50.

Again in the present embodiment, a superimposing function similar to that in Embodiment 3 can be provided. At this time, it is also possible to produce the images presented on the image display elements as an artificial three-dimensional image such as computer graphics and make the observe experience virtual reality of observing it simultaneously with an external natural image seen through the hologram lens 34.

Description will now be made of an embodiment in which a plurality of image display positions are provided in the direction of the optical axis of an observation optical system and a three-dimensional image is displayed.

Figure 11:
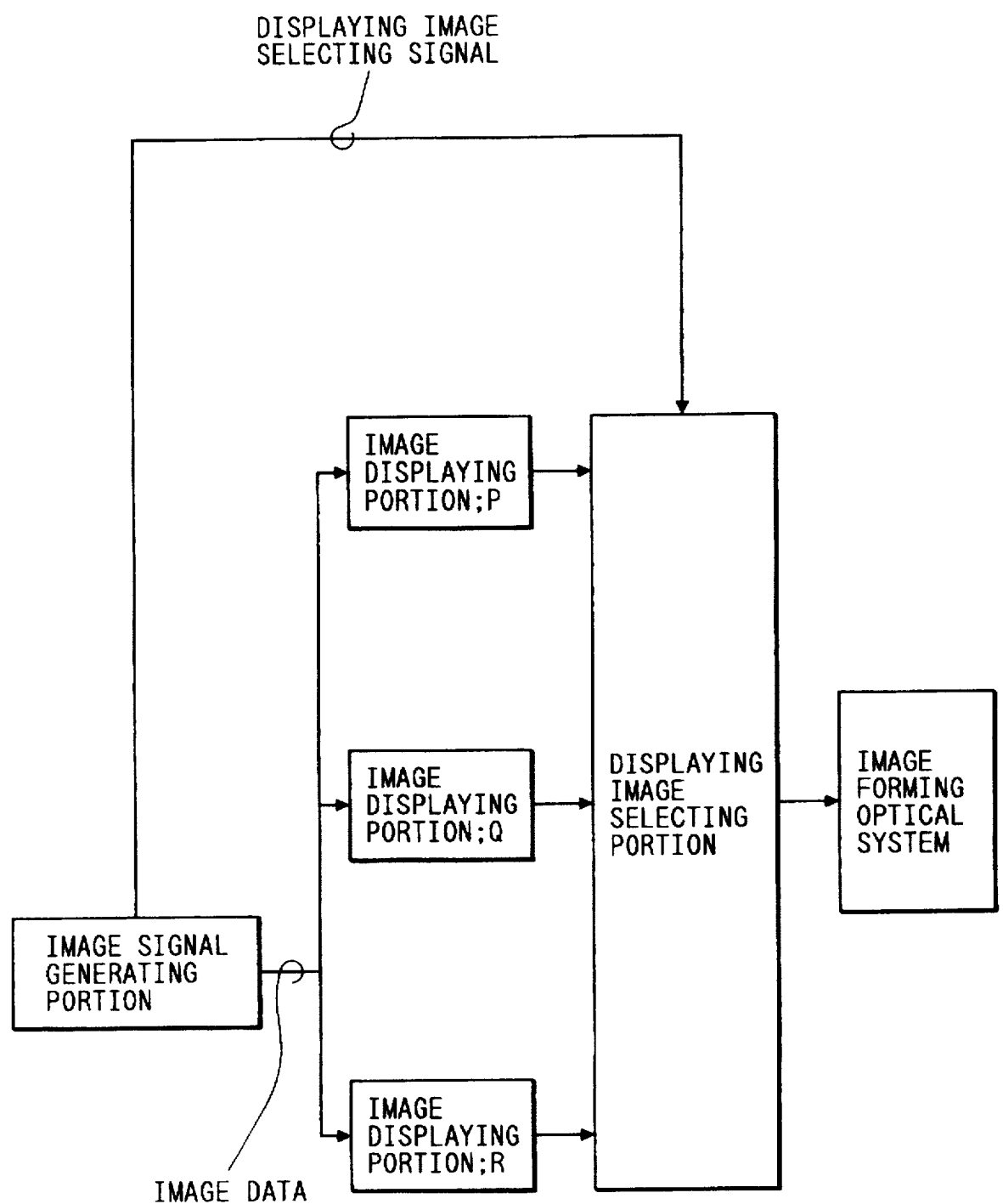
FIG. 11 is a block diagram of Embodiment 1 of a three-dimensional image displaying apparatus using the plurality of imaging plane displays of the present invention.

FIG. 11 shows a block diagram of one eye side of an image displaying apparatus according to Embodiment 1 relating to such a plurality display method. In the description hereinafter, FIG. 11 is handled as the right eye block diagram of the image displaying apparatus, and just the same thing applies to the left eye.

An image signal generating portion is a portion for generating the real data of an image and a displaying image selecting signal while keeping synchronism so that any time difference may not occur between right and left displaying images. The image signal generating portion is specifically comprised of a computer, a video, a laser disc or the like. A signal generated by a video, a laser disc or the like is usually the real data of an image, but a displaying image selecting signal can also be superimposed on a vertical synchronous signal portion to thereby generate two signals.

In the present embodiment, three displays P, Q and R are prepared in an image displaying portion. The real data of images inputted to the respective displays are equal. These three displays are indicated to the observer's eyes by an image forming optical system, but it never happens that the images of the plurality of displays are indicated to the observer at a time. The selection as to the image of which display should be indicated to the observer is controlled by a displaying image selecting portion which has received the displaying image selecting signal.

Figure 12:
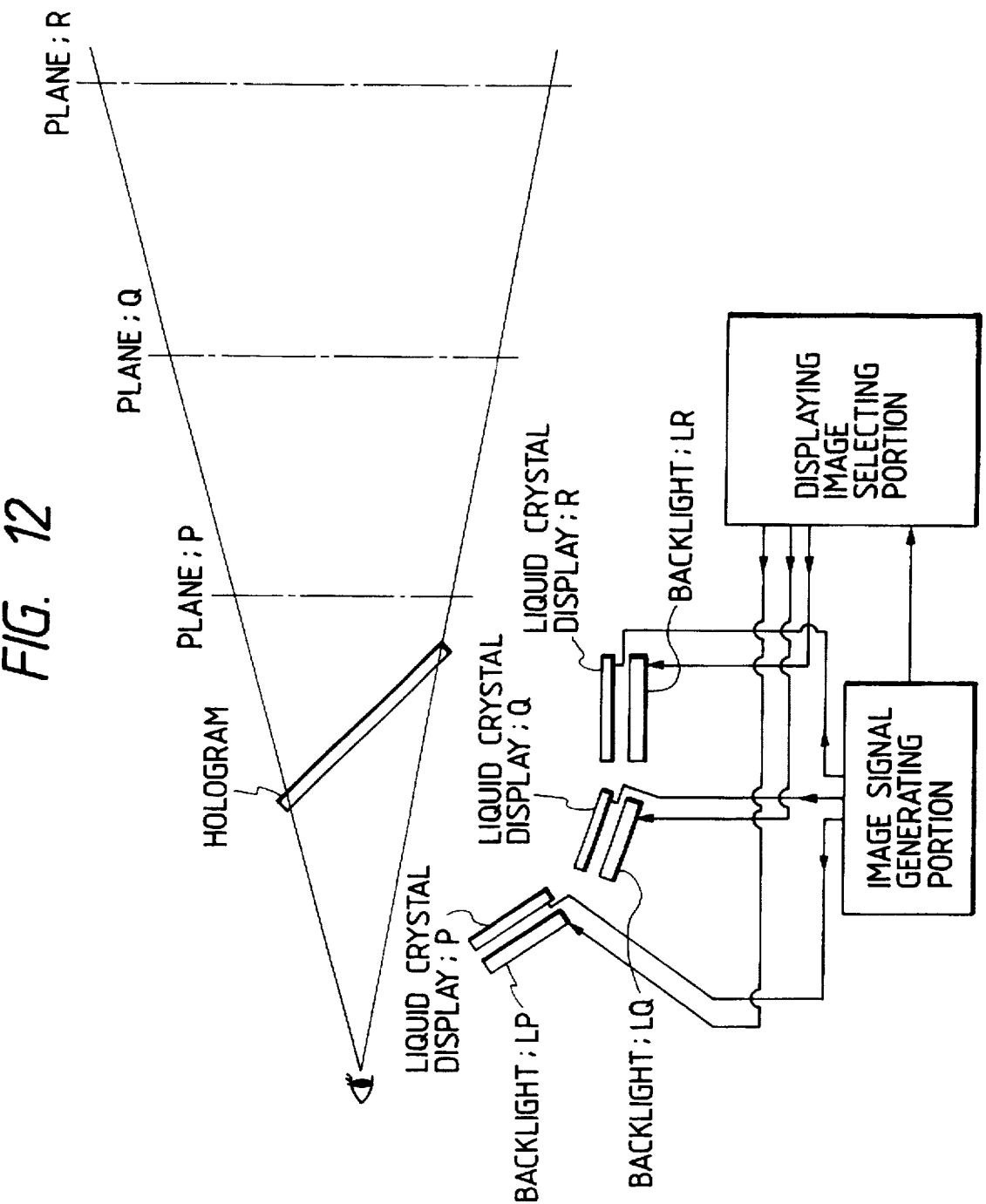
FIG. 12 shows the construction of an optical system in Embodiment 1 or 3 of the three-dimensional image displaying apparatus using a plurality of imaging plane displays.

FIG. 12 illustrates the situation of control in which an image displayed on a display is indicated to an observer's eyes.

Liquid crystal displays P, Q and R in FIG. 12 correspond to the image displaying portions P, Q and R, respectively, in FIG. 11. Backlight sources LP, LQ and LR are provided behind the respective liquid crystal displays, and the illuminating light from each backlight source is converted into monochromatic light by wavelength selecting means such as an interference filter, not shown, provided in each backlight source.

A hologram for performing an image formed action is made by triplex exposure, and performs a lens action of enlargedly forming the images displayed on the three liquid crystal displays at a lateral magnification appropriate for virtial image planes P, Q and R in accordance with the sizes and positions of displaying surfaces.

In the present embodiment, the image forming optical system is realized by the use of the triple exposure function of the hologram, but instead, it can also be realized by use of three lens units and a half mirror.

The displaying image selecting portion performs the function of selectively turning on one of the backlight sources of the three liquid crystal displays on the basis of the displaying image selecting signal to thereby stepwisely vary the depth position of the image indicated to the observer's eyes. A similar effect can be obtained by switching on and off the electric power supplied to the liquid crystal displays, or disposing switches in front of the displays and opening and closing the switches, instead of controlling the turn-on of the backlight sources.

Figure 13:
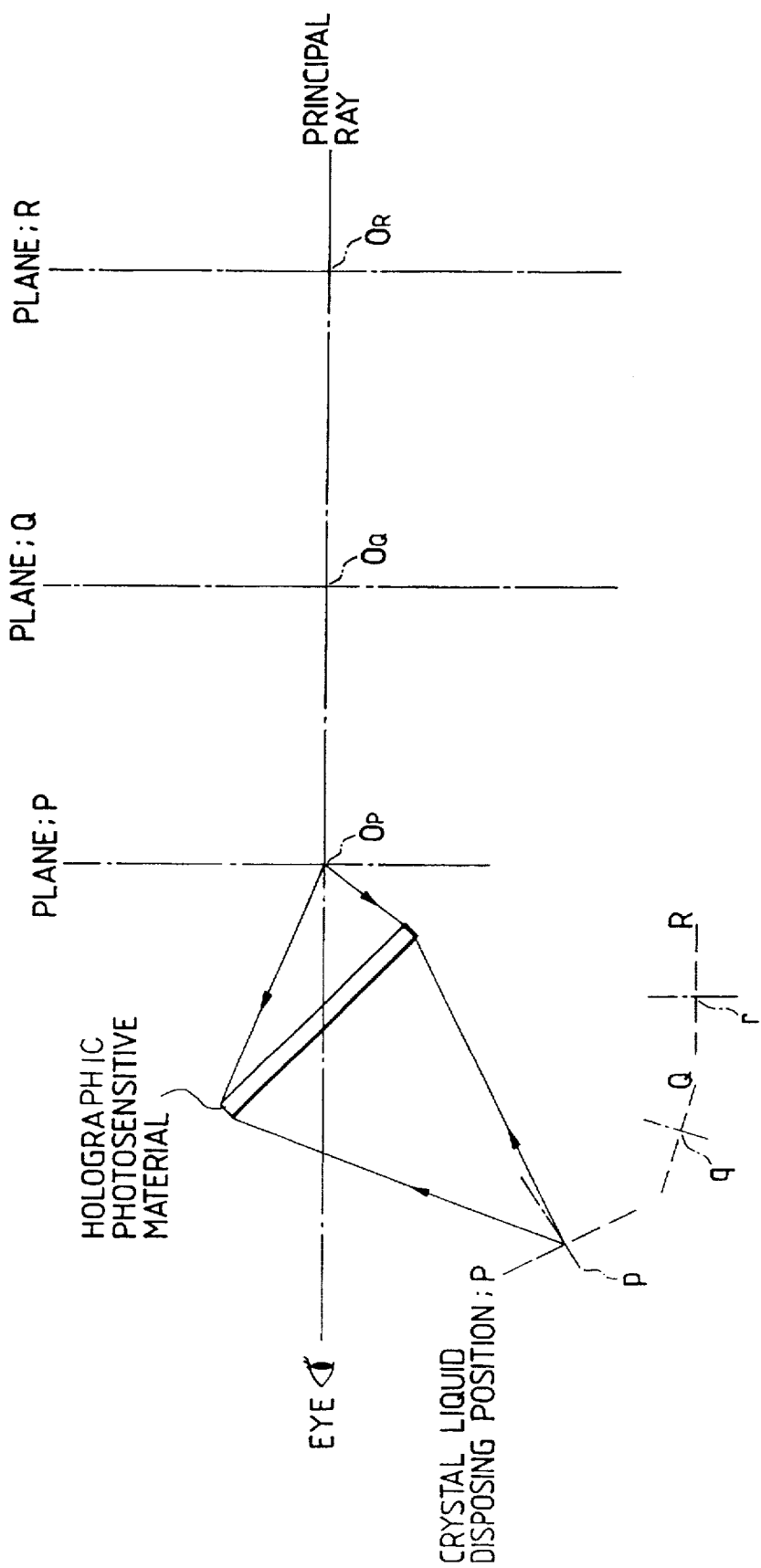
FIG. 13 shows a method of making triplex exposure hologram used in FIG. 12.

FIG. 13 shows a method of making a triplex exposure hologram. The virtual image planes P, Q and R of FIG. 13 are equivalent to the virtual image planes P, Q and R, respectively, of FIG. 12, and are virtual image plane positions of the images displayed on the liquid crystal displays.

The disposing positions of the liquid crystal displays P, Q and R of FIG. 12 coincide with the liquid crystal disposing positions P, Q and R, respectively, of FIG. 13.

In FIG. 13, p, q and r are centers of the positions at which the liquid crystal displays are disposed, and are optically in conjugate relationship with the point of intersection between the principal ray of the hologram after made and each imaging plane. The reference light wavefronts necessary for the triplex exposure of the hologram are wavefronts having these points p, q and r as point light sources, or wavefronts aberration-corrected on the basis thereof, and these defined as wavefronts $R_p$, $R_q$ and $R_r$.

Object light's wavefronts are wavefronts having points of intersection $O_P$, $O_Q$ and $O_R$ between the principal ray of the hologram and the virtual image planes P, Q and R as point light sources, or wavefronts provided by aberration-correcting them, and these are defined as wavefronts $O_P$, $O_Q$ and $O_R$. When holographic exposure by $R_p$ and $O_P$, holographic exposure by $R_q$ and $O_Q$ and holographic exposure by $R_r$ and $O_R$ are successively effected on the same holographic photosensitive material, a desired triplex exposure hologram can be made.

Figure 14:
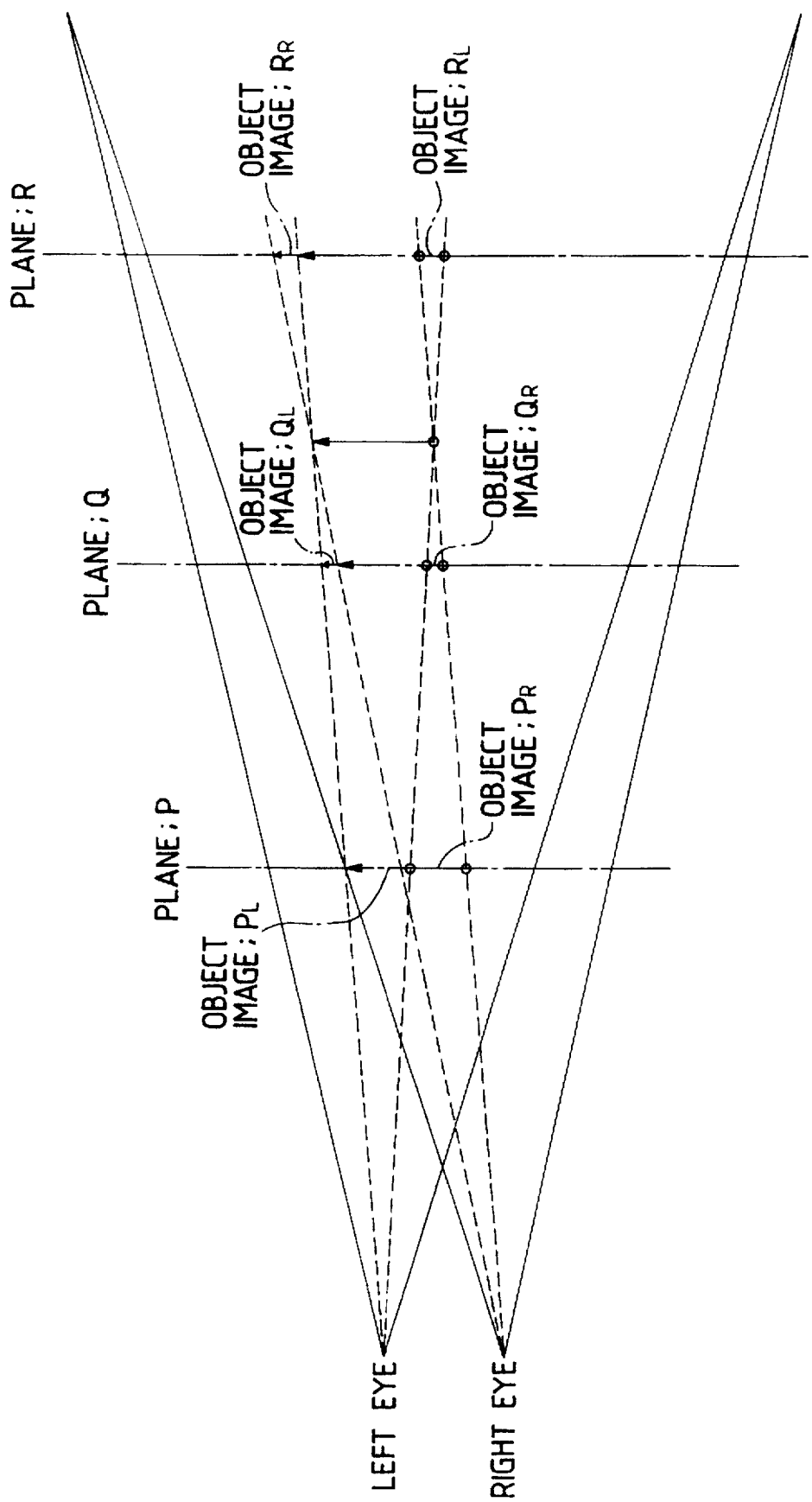
FIG. 14 is an illustration of the image forming relation in Embodiment 1 of the three-dimensional image displaying apparatus using a plurality of image plane displays.

FIG. 14 is an illustration regarding depth positions of images displayed. The planes P–R of FIG. 14 are equal to the planes P–R of FIG. 12, and the depth positions of the virtual images observed by right and left eyes are on the same planes P–R.

In FIG. 14, consider, for example, a case where an object X is made to look as if it was at the shown position between plane Q and plane R. If the object image displaying positions of the object X are the planes Q and R which are near to the object X, that is, between which the object is interposed, and these two planes are displayed alternately, there could be provided a display image approximate to that when the object X is usually at the shown position, i.e., an image which is soft to the eyes and which gives little malaise.

Further, the "Cardboard Effect" which usually occurs when the object X is displayed by only an object image $R_L$ (for the left eye) and an object image $R_R$ (for the right eye) on one plane (e.g. the plane R) is mitigated by the object image $Q_L$ ($Q_R$) on the plane Q for the left eye (the right eye) and the object image $R_L$ ($R_R$) on the plane R being displayed at a plurality of virtual image plane positions. Also, if display time ratio between the plane Q and the plane R is properly selected, the "Cardboard Effect" could be further mitigated. The ratio of the times for which display is effected on the plane Q and the plane R can be made, for example, into such a linear relation that it is in inverse proportion to the distances between the object X and the planes Q and R. Also, as regards the image displayed, processing to a hidden outline is effected, whereby the "Cardboard Effect" is mitigated. Further, as regards the virtual images on the plane Q and the plane R, if conversion of optical magnification of each hologram or conversion of image data is effected so that an image of a magnification corresponding to the positions of the virtual images can be observed by the observer, there could be observed an image which is softer to the eyes and gives little malaise.

When besides the object X, an object Y exists at a depth position near the plane P, the plane P is also selected as a select displaying position. In this case, the object images $P_L$ and $P_R$ of the object X on the plane P are displayed or chiefly displayed on the plane Q and the plane R and therefore, they may be displayed or not displayed at all.

In the present embodiment, the depth positions are limited to three planes, but when there exist more displaying depth positions (e.g. 100 planes), display time on each plane becomes smaller. In such case, in order to mitigage degree of dependency on afterimage effect necessary to make the observer recognize the object X, it sometimes becomes necessary to display object images even on the other imaging planes than those near the object. However, this is not applied to the case when time necessary for afterimage effect is obtained sufficiently.

In FIG. 14, it is not always necessary that the left and right displaying planes be within the same time and on the same plane. It is not necessary that the imaging depth positions be on the same planes P, Q and R for left and right.

Figure 15:
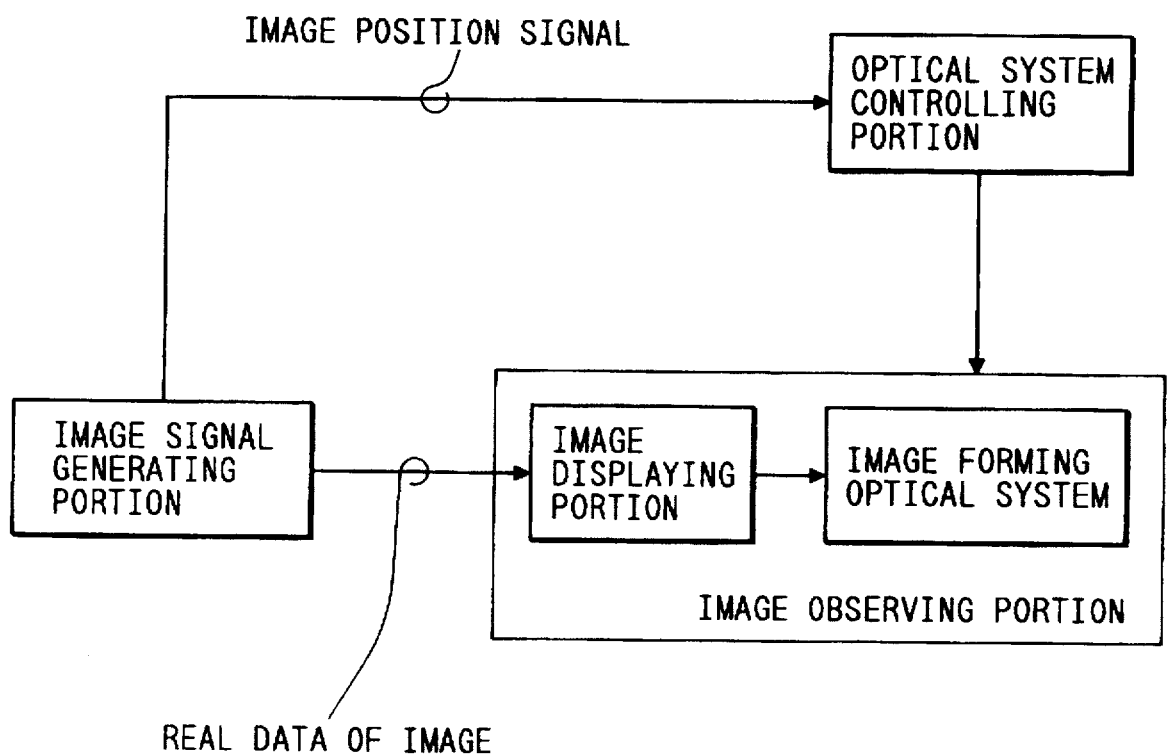
FIG. 15 is a block diagram of Embodiment 2 of the three-dimensional image displaying apparatus using a plurality of imaging plane displays.

FIG. 15 shows Embodiment 2 in which an image is displayed by a plurality of displaying planes, and this figure is a block diagram of the portion of the apparatus for a right eye. A similar block diagram will also hold true of left eye side. An image signal generating portion generates the real data of an image and an image position signal while taking timig of left and righ in order to provide images free of a time difference therebetween. The real data of the image is displayed on an image displaying portion in an image observing portion and is provided to the observer by an image forming optical system. An optical system controlling portion varies the depth position of the displayed image while controlling the image observing portion on the basis of the image position signal received thereby.

Figure 16:
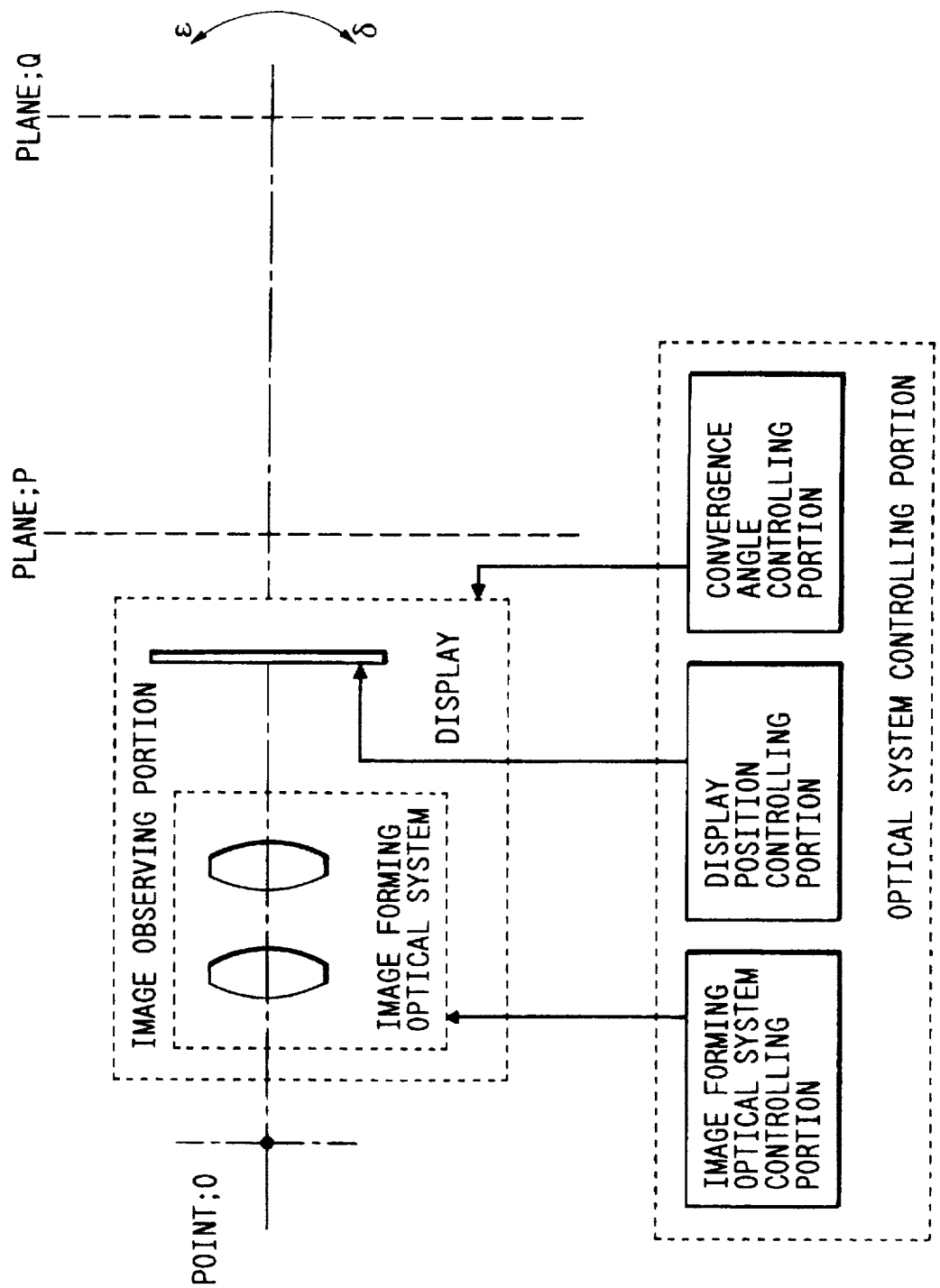
FIG. 16 shows the construction of an optical system in Embodiment 2 of the three-dimensional image displaying apparatus using a plurality of imaging plane displays.

FIG. 16 shows an apparatus in which the system of FIG. 15 is actually constructed. The apparatus comprises an optical system controlling portion comprised by an image forming optical system controlling portion, a display position controlling portion and a convergence angle controlling porion, an image forming optical system and an image observing portion comprised of displays. The displays are equal to the image displaying portions of FIG. 15. Again in FIG. 16, only the apparatus construction of one eye side is shown, but both of the left and right eye sides are similarly constructed.

The observer lays his eye at the position of a point O in FIG. 16, whereby the observer can see images displayed on the displays at depth positions images by the image forming optical imaged by the image forming optical system. The image forming optical system, as shown, comprises one or more lens units, the image forming optical system controlling portion moves the lens position in a left or right direction that is, moves the lens position in the direction of the optical axis of the image forming optical axis of the image forming optical system, the display position controlling portion controls the left and right positions of the displays and forms the displaying images of the displays between the plane P and the plane Q, whereby a three-dimensional image is displayed.

When the whole of the image forming optical system is positionally moved, the focal length of the image forming optical system does not change and therefore, the imaging magnification $\beta$ after the movement of the lens position does not coincide with the ideal lateral magnification $\alpha$ (a distance from the observer to the imaging plane and the size of the image being proportional to each other).

Therefore, the image is displayed with its size image-processed to $\beta/\alpha$ times. Any image component exceeding a maximum display image size determined by the displays and the angle of field of the image forming optical system is deleted. When the maximum angle of field differs for each display depth position, if the image component is deleted so that the displaying area may be unified to the smallest maximum angle of field, it will never happen that the object image is not displayed even if any depth position is selected, and there will be obtained an image giving no malaise.

Where the image forming optical system is comprised of a plurality of lenses, the display position controlling portion controls left and right positions of the displays as required, by use of the function of varying spacings between the constituent lenses by the image forming optical system controlling portion, whereby it is possible to obtain an ideal fixed lateral magnification $\alpha$ by the optical system itself in conformity with imaging planes P, Q and R. In this case, the magnification is controlled to a predetermined value by a portion of the optical system and therefore, burden of an image processing portion is mitigated.

When a maximum angle of field differs for each display depth position, if the image components are deleted so that the display area may be unified to the smallest maximum angle of field as in the case of a fixed focal length, it will never happen that the object image wil not be displayed even if any depth position is selected, and there can be obtained an image giving no malaise.

The convergence angle controlling portion moves the optical axis of the entire image observing portion between $\delta$ to $\epsilon$ about a point O, and varies the angle formed by the optical axes of two image observing portions substantially for left and right pupils. Thereby, there is provided an optimum in-plane display position for the depth position of the displayed image and a displayed image. Further, the convergence angle controlling portion can vary the range overlapped by images indicated to the left and right eyes in synchronism with the depth position of the displayed image, by control means, not shown, to thereby enhance the sharpness of the displayed image or widen the display field angle.

As described above, in the present embodiment, the observer can enjoy a natural image for any display depth position. Also, in FIG. 16, the object of the present invention can be realized by only one of the lens position moving function of the image forming optical system controlling portion and the display position moving function of the display position controlling portion. Further, the convergence angle controlling portion can be handled as an additional function, and even if it is absent, it will be possible to display an image at a depth position more natural than before.

Figure 17:
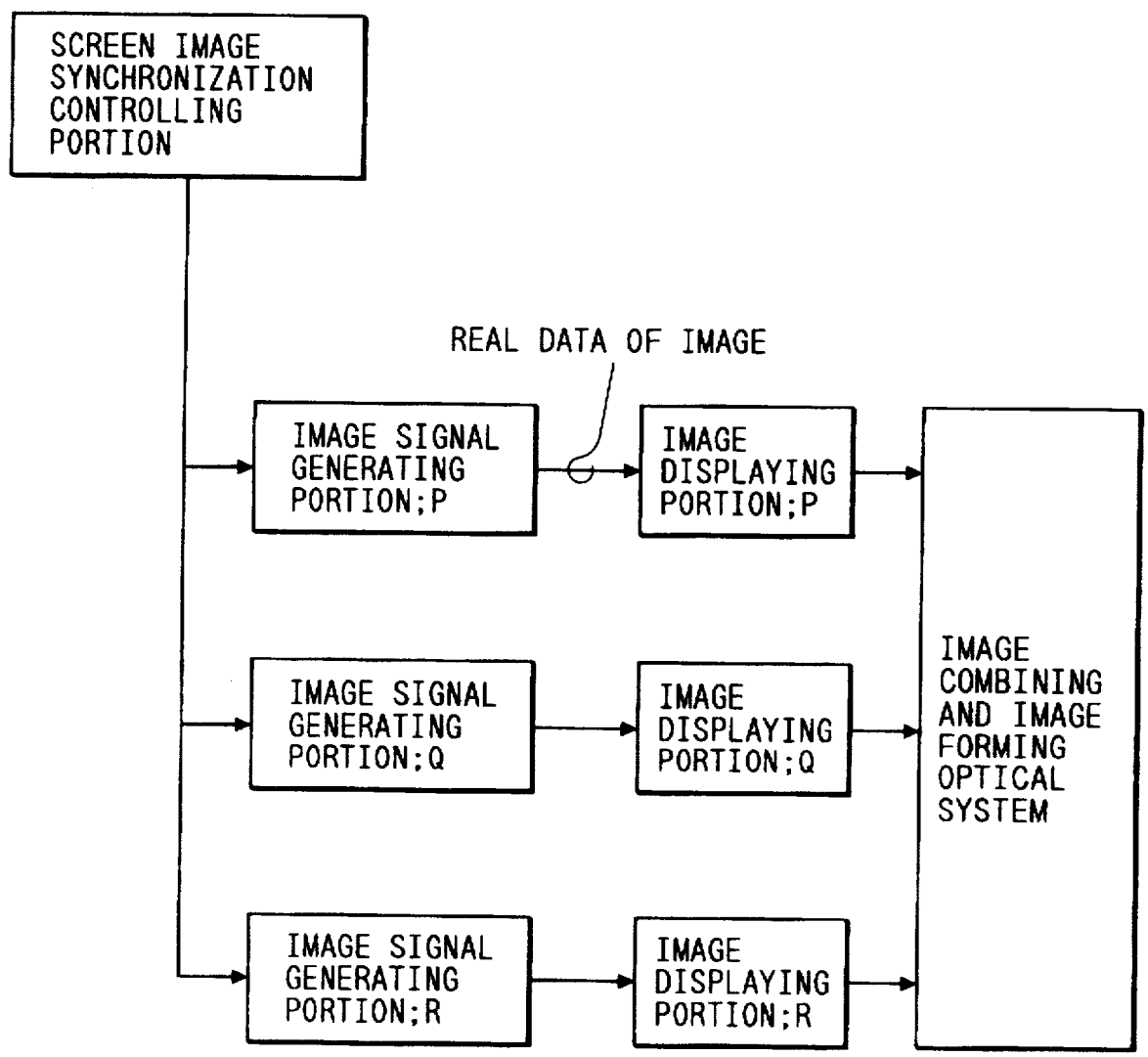
FIG. 17 is a block diagram of Embodiment 3 of the three-dimensional image displaying apparatus using a plurality of imaging plane displays.

FIG. 17 is a block diagram of one eye side of a displaying apparatus according to Embodiment 7 in which a three-dimensional image is displayed by a plurality of display planes. By making a screen image synchronization controlling portion common to the both eyes, an apparatus for the other eye can be similarly constructed.

In FIG. 17, image signal generating portions P, Q and R perform parallel operations on the basis of a synchronizing signal of the screen image synchronization controlling portion. The real data of the images from the image signal generating portions are displayed by image displaying portions P, Q and R. The manner in which an image combining and image forming optical system provides the display images by the image displaying portions P, Q and R to the observer will hereinafter be described with reference again to FIG. 12.

In FIG. 12, the hologram corresponds to the image combining and image forming optical system of FIG. 17, and the liquid crystal displays P, Q and R correspond to the image displaying portions P, Q and R, respectively, of FIG. 17. The hologram is made by triplex exposure, and forms the images of the liquid crystal displays P, Q and R on the image planes P, Q and R, respectively.

The differences of the present embodiment from the embodiment described with reference to FIG. 11 are:

1. The liquid crystal displays simultaneously display images; and
2. The display images by the liquid crystal displays differ from one another.

The liquid crystal displays are controlled so that as regards the object displayed, the image on a certain plane in the direction of the depth of this displayed object may be displayed and the images on the other planes may not be displayed at all.

Unlike the embodiment described with reference to FIG. 11, the images on the respective imaging planes are simultaneously displayed and therefore, it is not necessary to display the object on an imaging plane far from the position of the displayed object, with the afterimage effect of the eyes taken into account. Also, in the present embodiment, the images displayed on the respective image displaying portions may be the same so far as the imaging lateral magnification is proportional to the distance from the point of view to the image plane.

Also, in the hologram shown in FIG. 12, there occurs an overlapping portion of the effective beams of light of the left and right eyes on the hologram surface as shown in FIG. 3. In that case, it is possible to multiplexly expose and form the hologram in the overlapping portion as shown in FIG. 4, and effect image display of selectivity to the left and right eyes.

The invention may be embodied in other specific forms without departing from the spirit or essential features thereof. The aforedescribed embodiments should therefore be considered to be illustrative and not restrictive in all respects. The scope of the invention is indicated by the appended claims and is not restricted by the foregoing description. Further, all modifications and changes which fall within the range of equivalency of the appended claims are intended to be covered by the invention.

What is claimed is:

1. A displaying apparatus comprising:

a plurality of displays emitting light;

an optical system;

said optical system having holograms whose numbers are the same as numbers of said displays;

said holograms respectively having mutually different optical powers and making light from the corresponding display incident on a pupil of observer, so that virtual images to be formed at different positions in a depth direction of viewfield of said observer are made to be observed by said observer; and controlling means for controlling a display image to be displayed on each of said displays and timing for the display.

2. An apparatus according to claim 1, wherein said controlling means makes said observer alternatively observe said virtual images at said different positions.

3. An apparatus according to claim 2, wherein said controlling means controls time for making said observer observe one of said virtual images.

4. An apparatus according to claim 1, wherein said display apparatus is provided, corresponding to each of left and right pupils of said observer.

5. An apparatus according to claim 4, said apparatus having means for controlling an angle made by optical axes of two optical systems corresponding to left and right pupils of said observer.

6. A displaying method comprising:

the step of providing a plurality of displays emitting light and holograms whose numbers are the same as numbers of said displays, said holograms having mutually different optical powers;

the step of making light from the corresponding display incident on a pupil of an observer to make said observer observe a virtual image to be formed at different positions in depth direction of viewfield of said observer; and the step of controlling a display image to be displayed by each of said displays and a timing for the display.

7. A method according to claim 6, said controlling step having the step for making said observer alternatively observe said virtual images at different positions.

8. A method according to claim 7, wherein said controlling step has a step for controlling a time for making said observer observe one of said virtual images.

9. A method according to claim 6 wherein said display apparatus is provided, corresponding to each of left and right pupils of said observer having:

the step of controlling an angle made by optical axes of two optical systems corresponding to left and right pupils of said observer.

* * * * *

UNITED STATES PATENT AND TRADEMARK OFFICE
CERTIFICATE OF CORRECTION

PATENT NO. : 5,790,284
DATED : August 4, 1998
INVENTOR(S) : Nasosato Taniguchi, et al It is certified that error appears in the above-identified patent and that said Letters Patent is hereby corrected as shown below:

Title page, item [54] and Column 1, line 1,
In the Title:

Change "DISPLAY" to --DISPLAYING--.

item [75],

Change lead inventor's address from "Machida" to --Tokyo--.

Column 10, line 60, change "timig" to --timing--, same line, change "righ" to --right--.
Column 11, line 6, change "porion" --portion--.
Column 11, line 58, change "wil" to --will--.
Column 12, line 48, between "regards the" insert --to--.

Signed and Sealed this

Twenty-eighth Day of March, 2000

Attest:

Q. TODD DICKINSON

*Attesting Officer*  *Commissioner of Patents and Trademarks*